J. G. VINCENT.
ADDING AND LISTING MACHINE.
APPLICATION FILED SEPT. 4, 1908.
1,166,096.  Patented Dec. 28, 1915.
5 SHEETS—SHEET 1.
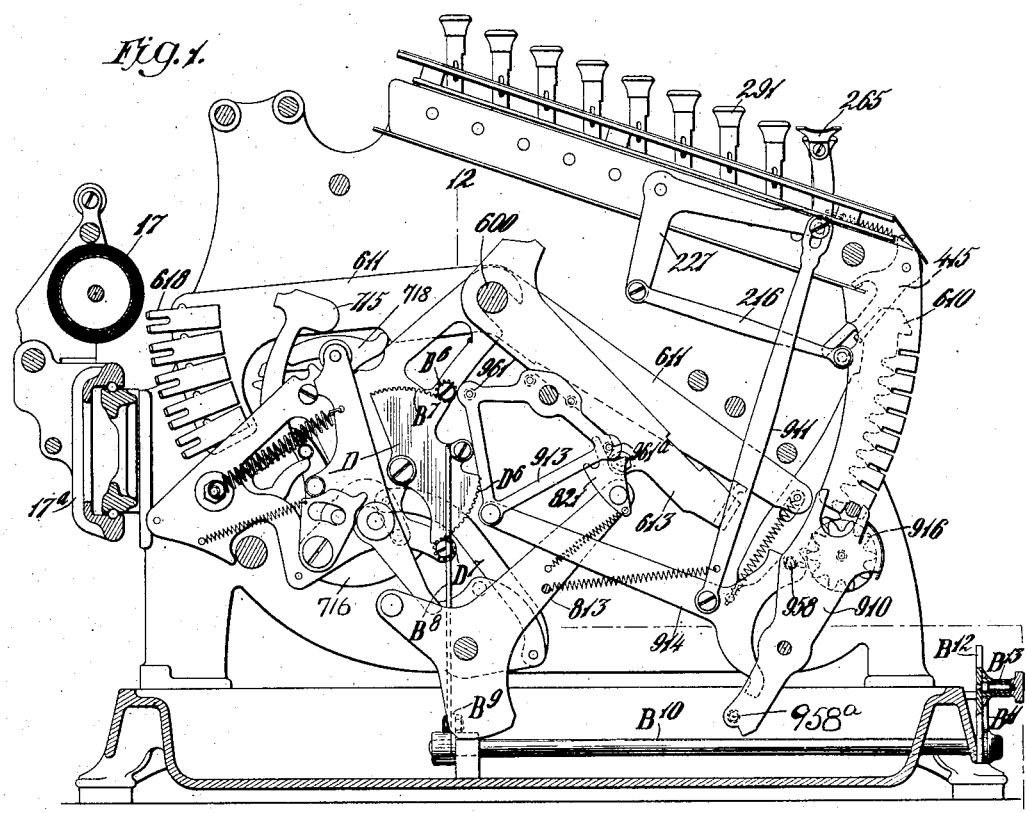
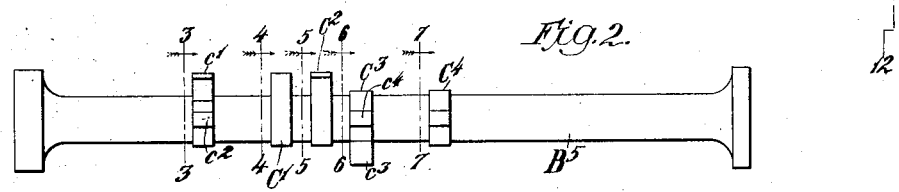
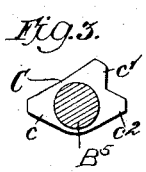   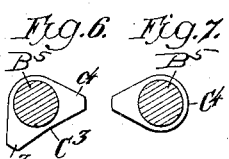

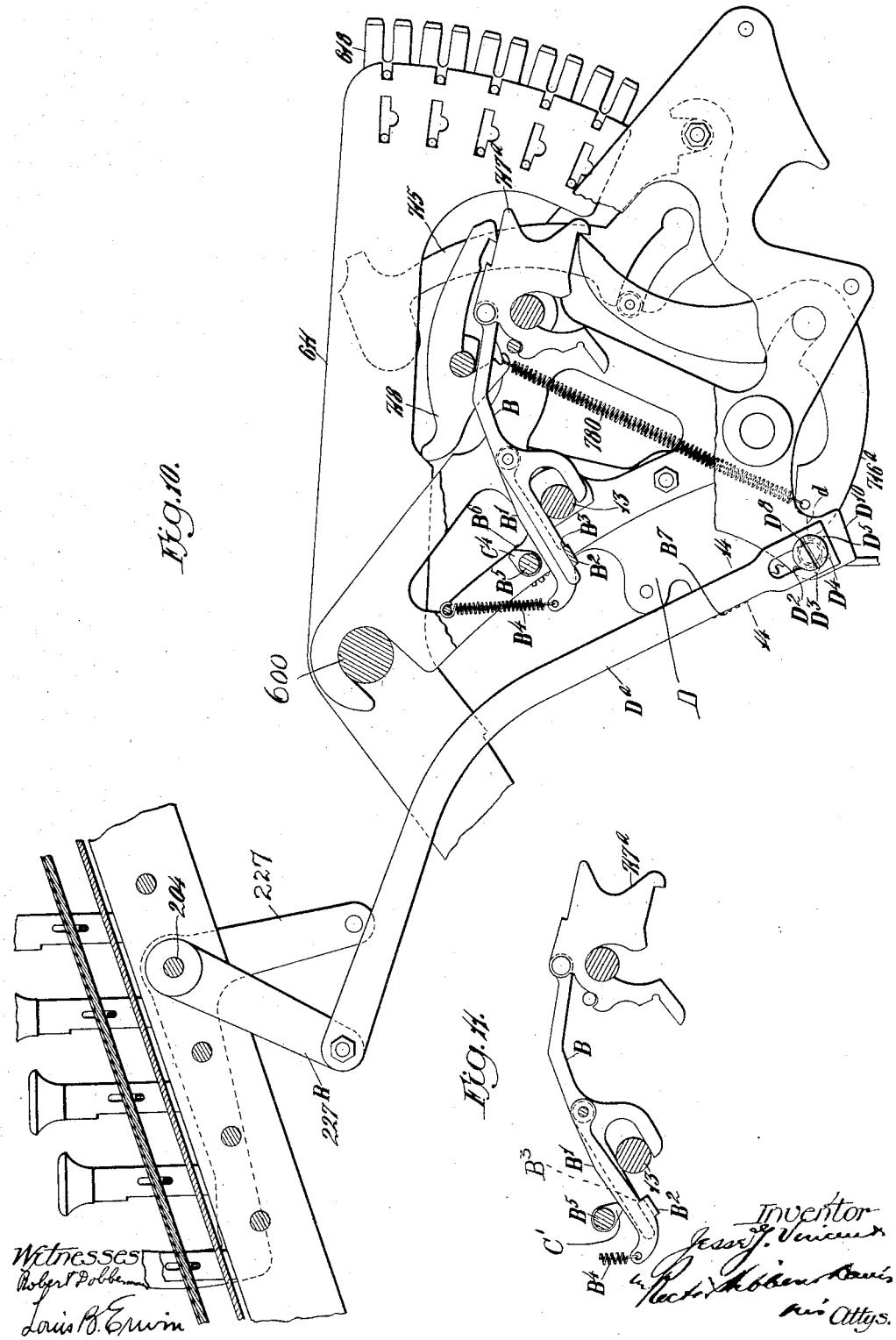

J. G. VINCENT.
ADDING AND LISTING MACHINE.
APPLICATION FILED SEPT. 4, 1908.
1,166,096.
Patented Dec. 28, 1915.
5 SHEETS—SHEET 3.
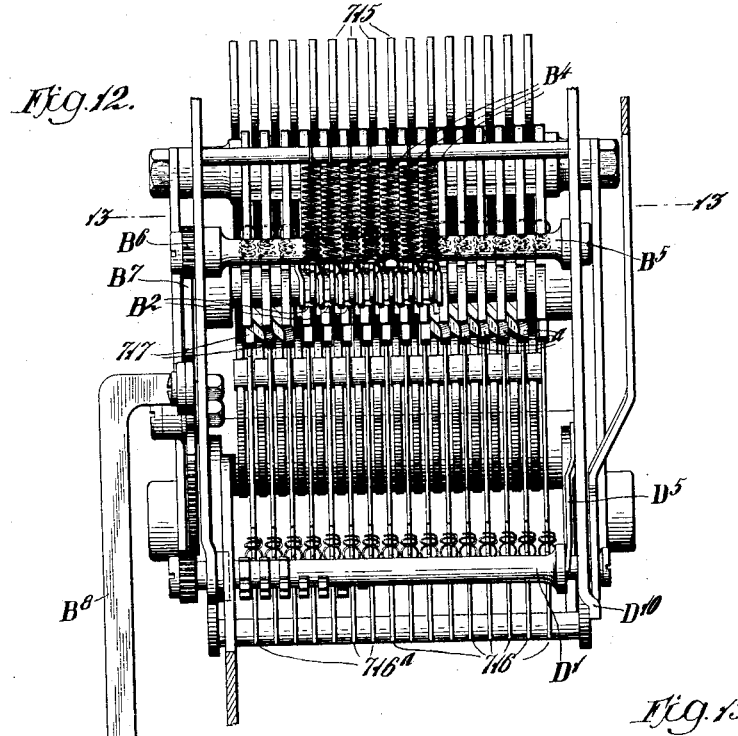
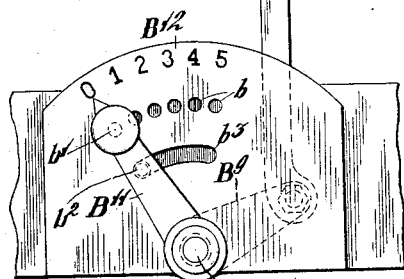
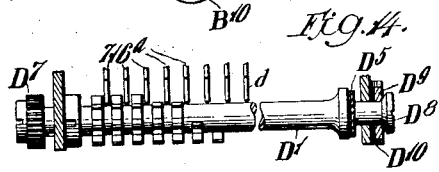
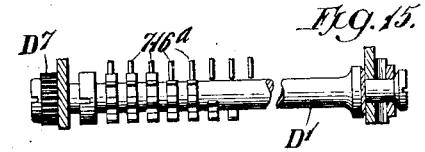
Witnesses:
Robert Dobberman
Louis B. Erwin
Inventor
Jesse G. Vincent
by Victor Moxen Davis
his Attys.

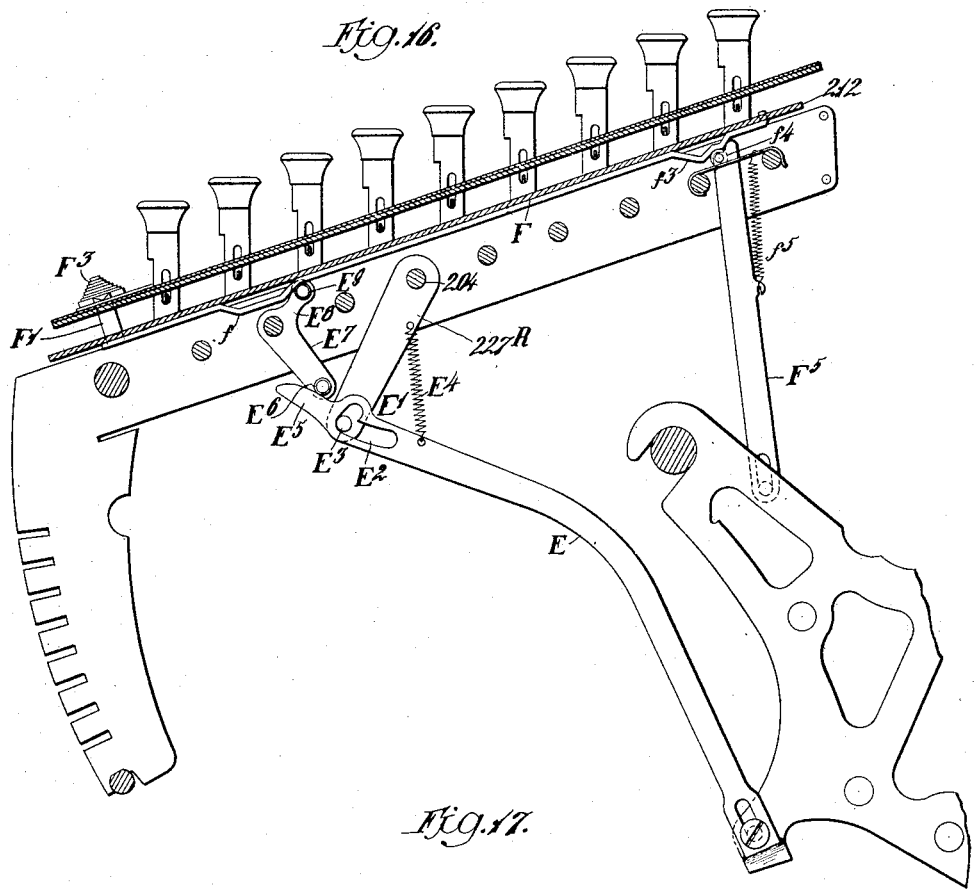
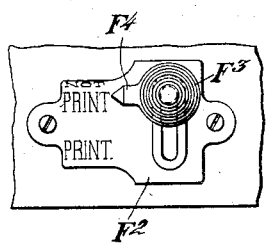

J. G. VINCENT.
ADDING AND LISTING MACHINE.
APPLICATION FILED SEPT. 4, 1908.

1,166,096.

Patented Dec. 28, 1915.
5 SHEETS—SHEET 5.

| | |
|---:|---:|
| 3,7 2 0 | 4 0,0 6 0.6 6 |
| 3,0 5 5,0 5 0 | 4,0 4 0.0 4 |
| 3 6 0,0 0 6 | 1 4.7 0 |
| 2,2 3 2,2 2 2 | 3,4 5 6.7 8 |
| 5,6 5 0,9 9 8 | 5 1,6 7 2.1 8 * |

Fig. 20.

| | | |
|---:|---:|---:|
| 1,1 0 | 2,2 2 | 2 3.3 3 |
| 3,3 0 | 5 8,8 0 | 6 5.4 3 |
| 4 0 | 4 0 5,5 0 | 4 4 0.7 9 |
| 4,0 6 | 3 3.3 0 | 3 3 |
| 7,0 7 | 4 5 6.0 0 | 3 3.3 3 |
| 1,1 0 | 3 0 2.1 1 | 2 5.7 9 |
| | 1,2 5 7.9 3 | 5 8 9.0 0 * |

Fig. 21.

| | |
|---:|---:|
| 2,3 4 0,0 | 3,4 4 4,3 0 2.2 0 |
| 2,2 7 0,0 | 3,3 2 0,6 6 6.6 |
| 2 0 5,0 | 3,4 5 5.0 0 |
| 4,4 4 4,0 | 1,8 4 3.0 0 |
| 7 4 3,0 | 1,0 2 2.2 3 |
| 1 1 2,0 | 2,2 2 2,2 3 0.5 0 |
| | 8,9 9 3,5 1 9.5 9 * |

Fig. 22.

| | | |
|---:|---:|---:|
| 2,4 2 | 2,4 6 | 2,3 0 4,0 0 0.0 0 |
| 2 | 3 | 3 0 0,2 3 3.0 0 0 |
| 9 5 | 3 3 | 3 0,4 3 0.0 0 |
| 1,5 7 | 3 5 | 1 3 0,3 2 0.1 1 |
| | | 5,4 6 7,0 8 0.1 1 * |

Fig. 23.

| | | |
|---:|---:|---:|
| 3 0 | 3,3 0 0, | 4,5 5 0.0 0 |
| 5,5 0 | 3 3 0, | 5 5,5 0 5.5 5 |
| 3,3 0 | 3,4 5 0, | 5,6 0 6.0 0 |
| 7 0 | 2,2 0 0, | 3,0 4 4.4 0 |
| 4 0 | 1 6 0, | 2 2 2.1 0 |
| 1 1 | 6 0, | 6 7 7.0 0 |
| | | 6 9,6 0 5.0 5 * |

Witnesses:
Robert Dobberman
Louis B. Erwin

Inventor
Jesse G. Vincent
by Rector Hibbard Davis
his Attys.

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING AND LISTING MACHINE.

1,166,096.  Specification of Letters Patent.  Patented Dec. 28, 1915.

Application filed September 4, 1908. Serial No. 451,667.

*To all whom it may concern:*

Be it known that I, JESSE G. VINCENT, a citizen of the United States, residing at Detroit, in the county of Wayne and State of Michigan, have invented certain new and useful Improvements in Adding and Listing Machines, of which the following is a specification.

In machines of this character it is common to employ a series of spring-actuated hammers to do the printing and to provide for automatically tripping off hammers from left to right for the purpose of printing ciphers in decimal places of any amount where no digits occur. It is also common practice to interrupt the tripping off of hammers when the machine is to be used for simultaneously printing two or more separate columns. Reference may be had to the Gooch Patent No. 825,205, July 3, 1906, which shows an adding and listing machine of the well-known Burroughs type (see Burroughs Patents Nos. 504,963 and 505,078, September 12, 1893) modified to provide for interrupting the automatic tripping of hammers at will. Such a machine is commonly termed "split and normal" because of its capablity for operating either with all of the hammers related for the automatic tripping from left to right or operating in the so-called "split" or divided state so that ciphers will not be printed between items or amounts of separate columns.

The Gooch invention provides for locating the point of split variously but not for changing the location at will by the user of the machine through manipulation of devices on the exterior of the machine, though this latter expedient has heretofore been practised in what is known as a "variable split and normal" machine.

The present invention relates to this last mentioned advanced type of adding and listing machine and the principal object is to secure increased reliability in operation and convenience in manipulation of the special parts. The invention not only relates to the so-called "variable split" and capabilities for restoring the machine to normal, but also embraces regulating devices whereby the printing of totals for one or more lists can be eliminated at will, as, for example, when lists of dates or designating numbers or both are printed in association with lists of amounts. In this latter connection the object is to positively lock varying numbers of impression devices such as the hammers already mentioned, whereby such elements are prevented from moving in a totaling operation.

In the drawings which accompany and form a part of this specification Figure 1 represents a sectional left side elevation of an adding and listing machine of the Burroughs type having the improvements of the present invention incorporated therein; Fig. 2 is a front elevation of a certain shaft for effecting the variable split; Figs. 3, 4, 5, 6 and 7 are cross-sections of said shaft taken on lines 3—3, 4—4, 5—5, 6—6 and 7—7 respectively; Fig. 8 is a front elevation of the hammer blocking shaft; Fig. 9 is a cross-section of the same taken on the line 9—9 of Fig. 8; Fig. 10 is a sectional right side elevation of part of the machine on an enlarged scale as compared with Fig. 1; Fig. 11 is a detail sectional elevation of parts appearing in Fig. 10 but with the relative positions changed; Fig. 12 is a sectional front elevation taken substantially on the line 12—12 of Fig. 1; Fig. 13 is a sectional top plan view taken substantially on the line 13—13 of Fig. 12; Fig. 14 is a detail sectional top plan view on the line 14—14 of Fig. 10; Fig. 15 is a similar view illustrating a changed relation of parts; Fig. 16 is a fragmentary sectional right side elevation illustrating a construction somewhat different from that shown in Fig. 10 for controlling the hammer blocking devices; Fig. 17 is a fragmentary top plan view of the keyboard showing indexing means employed with the construction shown in Fig. 16; and Figs. 18 to 23 illustrate samples of different kinds of work the machine is capable of performing.

In the drawings the reference numeral 291 designates the usual amount keys arranged in parallel rows with the keys in each row inscribed with numerals from 1 to 9.

The reference numeral 610 designates segmental racks of the usual form normally upheld by latches 415, the latter adapted to be individually released by the depression of amount keys.

The reference numeral 611 designates the usual levers loosely mounted upon the rock shaft 600 and having slot and pin connections at their forward ends with the racks 610, the rear ends of said levers carrying segmental series of type plates 618 in front of a roller platen 17 in a laterally shifting carriage 17ª at the back of the machine. Adding pinions 916 coöperate as usual with the racks 610, said pinions being mounted in a rocking frame 910 having studs 958 and 958ª above and below its center of oscillation.

The reference numeral 265 designates the usual total key surmounting the upstanding arm of a bell crank lever 227 which operates a universal bail 216 for simultaneously displacing all of the latches 415 when the total key is depressed. A link 911 has a slot and pin connection with said lever 227 at its upper end and at its lower end is coupled to a pitman 914 forked to engage either the stud 958 or the stud 958ª, said pitman being coupled at its rear end to a rocking frame 913 having studs 961 and 961ª at rearward and forward portions for coöperation with a wipe plate or pawl 821 on a rock arm 813.

The reference numeral 613 designates the usual restoring frame or bail carried by the rock shaft 600 and acting to elevate the front arms of the levers 611.

All of the above designated parts are old and well known and operate in the familiar manner.

The impression devices comprise pivoted hammers 715, pivoted hammer drivers 716 and 716ª engaging with the hammers in the usual way, pivoted latches 717 and 717ª normally restraining said hammer drivers, and latch displacing pawls 718 connected by springs 780 with the hammer drivers, said springs serving the double function of impelling the hammer drivers and enforcing engagement of the pawl 718 with the latches. Said pawls as usual have tails to coöperate with the cam shoulders on the levers 611, so that only when a lever is moved far enough to bring a digit type to printing position can the associated pawl act to lift its latch.

In carrying out the present invention certain of the hammer drivers and certain of the latches are specially constructed, such hammer drivers and latches being those designated 716ª and 717ª. The regular latches 717 have the usual overlapping tails, $a$, for causing tripping of one latch by another to effect cipher printing in the well known manner. The latch 717ª farthest to the right is also equipped with one of these overlapping tails, but this particular latch and a number of others to the left are especially constructed to provide for interruption at one point or another or at two points at once of the automatic cipher tripping. To the upper part of each of the latches 717ª (Fig. 10) there is pivotally connected the forward end of a pitman B of angular form and widened and bifurcated at its front end to embrace a shaft 13, with provision for forward and backward movement of the pitman accommodating itself to the pivotal movement of the connected latch when disengaging from and reëngaging with the associated hammer driver. There is pivoted to each of the pitmen B forward of the shaft 13, except the pitman farthest to the left, an arm B′ having a laterally turned flange or lip B² constituting a catch for engaging a shoulder B³ on the adjacent pitman to the left, such engagement between all the pitmen being normally enforced by springs B⁴ connecting the forward ends of the arms B′ with a suitable fixed support. It will be seen that with such a construction the pitman of the latch 717ª farthest to the left, when such latch is displaced either by its pawl 718 or by the overlapping tail $a$ of the adjacent latch to the left, will be thrust forward and its shoulder B³ will act against the flange or lip B² of the arm B′ on the next adjacent pitman to the right, thereby thrusting that pitman forward and so displacing the connected latch, and this operation will continue through the series of specially equipped latches so long as the normal condition above described exists, the pitman of the latch 717ª farthest to the right not necessarily having a shoulder B³ because the next adjacent latch 717 is not equipped with any pitman but is tripped in the regular way by an overlapping tail of said latch 717ª. Mounted a short distance above the series of catch arms B′ and journaled in suitable side-frame supports is a rock shaft B⁵ which carries a series of cam projections for variously operating upon certain of said arms to displace the same and interrupt the tripping of latches at one or another point or at two points at once. In the present instance the construction shown provides for such interruption at five different points and the examples of work shown in Figs. 18 to 23 indicate a fifteen bank machine or one capable of printing in fifteen decimal places. The particular arrangement of cam fingers here shown provides for the so-called splitting singly between the fifth and sixth (Fig. 21) or seventh and eighth (Fig. 19) decimal places and doubly between the third and fourth and sixth and seventh (Fig. 22), or third and fourth and seventh and eighth (Fig. 23), or third and fourth and ninth and tenth decimal places (Fig. 20), counting from the left in each instance. The cam fingers on said shaft are therefore located to operate upon the catch arms of the fourth, sixth, seventh, eighth and tenth latches, counting from the left and including the regular latches 717. The cam piece C farthest to the left comprises three projections or fingers $c$, $c'$ and $c^2$, (Fig. 3) the fingers $c$ and $c^1$ extending generally at angles of about 135 degrees to each other and the fingers $c$ and $c^2$ being in diametrical alinement. The next cam piece C¹ (Fig. 4) is single and extends at an angle from the shaft intermediate the two fingers $c$ and $c'$ of the cam piece C. The third cam piece C² (Fig. 5) is likewise single and extends from the shaft at the same angle as the finger $c^1$ of the first cam piece C. The fourth cam piece C³ (Fig. 6) is duplex and of the same outline as that portion of the cam piece C embracing the fingers $c$ and $c'$. The finger $c^3$ of this cam piece extends on a different angle from the shaft than any of the fingers of cam pieces already described but the finger $c^4$ extends on the same angle as the finger $c^2$ of the first cam piece C. The remaining cam piece C⁴ (Fig. 7), is single and extends from the shaft at the same angle as the finger $c$ of the first cam piece.

Normally all of the cam pieces above described are away from the different catch arms P' with which they are in alinement. The movement of the shaft B⁵ to bring the cam pieces into action is divided into five periods corresponding with the manner in which the cam fingers are stepped or spaced apart circumferentially on the shaft. Under the arrangement shown in the present instance the finger $c^3$ of the cam piece C³ first takes effect to interrupt the coöperative action between the seventh and eighth latches as represented by the example of work shown in Fig. 19. Next the finger $c$ of the cam C and the cam finger C⁴ come into play to interrupt the coöperative action between the third and fourth and ninth and tenth latches, producing the effect illustrated by the example of work shown in Fig. 20. Turning of the shaft to the third position brings the cam C' into action for interrupting the coöperative action between the fifth and sixth latches for producing the effect illustrated in Fig. 21. Further turning of the shaft brings into play the finger $c'$ of the cam C and the cam finger C² for interrupting coöperative action between the third and fourth and sixth and seventh latches to produce the effect illustrated in Fig. 22. The fifth position to which the shaft is turned brings into play the finger $c^2$ of the cam C and the finger $c^4$ of the cam C³, producing the effect illustrated in Fig. 23.

The single cam pieces are of the same formation as fingers of the other cam pieces, each cam finger being tapered in form and practically truncated, though there is a slight convexity of the outer edge. This provides for an easy displacing action of any cam finger upon the associated catch arm and furthermore for an engagement between the truncated end of the finger and the upper edge of the catch arm calculated to hold the latter definitely displaced and prevent any accidental disturbance of the split adjustment. At the same time the slight convexity of the end of the cam finger provides for an easy sliding action when a catch arm has been displaced and the latch with which it is connected is rocked by the associated pawl 718. Of course as the shaft is turned carrying any cam finger beyond the associated catch arm the latter will be restored to normal by its spring B⁴.

The means for manipulating the cam shaft comprise a gear wheel B⁶ secured to its left hand end; a rocking plate D mounted on the left side of the frame work and having a gear segment B⁷ meshing with said gear wheel B⁶; a vertical link B⁸ coupled to said plate at its upper end; a rock shaft B¹⁰ journaled in suitable bearings in the base of the machine and having a crank arm B⁹ coupled to the lower end of said link, the latter being given a right angle bend to adapt it for pivotal connection with the two elements above described, to-wit the plate D and the rock shaft B¹⁰ which move in planes at right angles to each other; an arm B¹¹ which is secured to the front end of said rock shaft where the latter protrudes from the machine casing; and a scale plate B¹² secured to the front of the machine. The arm B¹¹ is equipped with a suitable handle B¹³ by which to move it back and forth and is formed at its outer end as a pointer to register with appropriate inscriptions on the plate B¹². In the present instance the scale comprises simply a cipher and the numerals 1, 2, 3, 4 and 5, as shown in Fig. 12. The plate B¹² is preferably perforated as shown at $b$ for receiving a spring pin $b'$ of the handle B¹³ so as to make certain the positioning of the arm B¹¹, and the latter is preferably equipped with a roller stud $b^2$ engaging an arc-shaped slot in the plate B¹². It will be obvious that the swinging of said arm B¹¹ will rotate the shaft B⁵ and the divisions of movement of said shaft before referred to are properly measured by the scale. It will be seen that this arrangement provides a ready and certain means of locating the split at the point or points desired.

The construction here shown provides a greater number of catch arms or couplers than there are cam pieces for displacing same, there being but five of the cam pieces whereas seven couplers are provided, but it is considered preferable to duplicate the coupler devices at intervening locations where cam pieces are not used rather than to resort to the usual overlapping tails, as better results are secured in the matter of exact timing in operation through the use of these coupler devices and furthermore it simplifies the proposition of assembling to have the coupler devices employed throughout the area of the latch organization in which splits are to be worked. Of course it will be obvious that the arrangement can be indefinitely varied from that here shown, more or less cams being provided and the location of the same and of corresponding coupler devices changed to suit varying conditions.

As suggested in the opening statement of this specification, it is desirable with some classes of work to provide for eliminating the printing of totals of one or more columns where several are being printed under a split adjustment of the machine, and the present invention provides for accomplishing this by preventing movement of the impression hammers which would have to operate in order to print such totals. In pointing out parts of the printing mechanism reference was made to the circumstance that certain of the hammer drivers were specially constructed, the same being designated by the numeral 716$^a$. In the present instance the special construction consists in a forward extension $d$, Fig. 10, having a straight upper edge. Immediately in rear of these extensions there is journaled in the side frame pieces a shaft $D'$ carrying projections $D^2$, $D^3$, $D^4$ and $D^5$ (Figs. 8 and 9) adapted to co-act with said extensions for the purpose of obstructing movement of the special hammer drivers and consequently movement of their hammers. In the construction as here shown there are three of the projections $D^2$; five of the projections $D^3$ circumferentially spaced from the projection $D^2$ and three of them in line with the latter projections; six of the projections $D^4$ circumferentially spaced from the projections $D^3$ and five of them in line with the latter; and seven of the projections $D^5$ circumferentially spaced from the projection $D^4$ and six of them in line therewith. The faces of all of the projections are radial to the shaft $D^1$ as are the straight edges of the hammer driver extensions $d$ at normal. The shaft $D^1$ is mounted to move a limited extent horizontally, in addition to being rotatable, but normally said shaft is pressed to the left by a flat spring $D^5$ bearing against its right hand end, see Fig. 12, said spring being secured to a suitable part of the frame work. This normal position of the shaft is such as to bring the projections before described out of alinement with the hammer driver extensions as shown in Fig. 14, said projections being spaced apart on the shaft lengthwise thereof. It will be noted that extending from the left toward the right hand end of the shaft there are first three sets of projections, four in each set, and then two sets of projections, three in each set, and then one set of projections comprising but two and finally a single projection and that all of the sets or projections are normally out of alinement with the hammer driver extensions. Furthermore in the normal position of the shaft the radial faces of the rearmost projections $D^3$ stand vertically, affording no obstruction to the upward swing of the hammer driver extensions. It is only when a split or splits are established by moving the handle $B^{11}$ from the zero position that any of the projections come into play. The location and arrangement of the projections must of course correspond with the location of devices for effecting splits. In the present instance the projections are arranged to obstruct three, five, six or seven hammer drivers, beginning with the one farthest to the left. It will be noted that where provision is made for establishing a split between the third and fourth decimal places counting from the left the hammer blocking arrangement provides for a corresponding obstruction of the three left hand hammers; and further that provision is made for obstructing five left hand hammers, which corresponds with the establishment of a split between the fifth and sixth decimal places. Likewise six or seven hammers can be obstructed to correspond with the splits which can be established between the sixth and seventh and seventh and eighth decimal places. Variation in the number of hammers obstructed is brought about through the turning of the shaft $D^1$, the arrangement of the projections thereon as heretofore described providing for the engagement of the projections $D^3$ with the extensions of the three left hand hammer drivers, while all the remaining hammer drivers are unobstructed by any projections on the shaft. When further turned the shaft will present its five projections $D^3$ to five left hand hammers, leaving the others unobstructed, and so with the six projections $D^4$ and the seven projections $D^5$. The turning of the shaft to desired position is done when the shaft is in the normal position illustrated in Fig. 14, the projections being then out of line with the hammer drivers and so free to pass between the same when the shaft is turned beyond the position where the three projections $D^3$ would be positioned in coöperation with the hammer driver extensions. Having been turned to the proper position the shaft will be thrust endwise (to the right) by depression of the total key through connections hereinafter described, so that during an operation with the total key depressed the selected set of projections will perform their function of obstructing a certain number of hammers. The turning of the shaft $D^1$ is done through the same connections which turn the shaft $B^5$. The rocking plate $D$ hereinbefore mentioned is formed with a gear segment $D^6$, which meshes with a gear wheel $D^7$ on the left hand end of the shaft $D^1$ and wide enough (see Fig. 12) to remain properly in mesh while the said shaft moves endwise. The above construction insures synchronous action of the splitting devices and the hammer blocking devices.

The means here shown for thrusting the shaft $D^1$ to the right comprise a journal head $D^8$ on the right hand journal of said shaft and a thrust bar $D^9$ slotted to embrace said journal and beveled at its lower end to bear against a beveled portion $D^{10}$ of the frame-work, see Fig. 12. According to the construction shown in Fig. 10 the thrust bar is coupled at its upper forward end to an arm $227^R$ secured to the shaft 204 which carries the total key bell crank 227. It follows that depression of the total key by swinging said arm rearwardly forces the thrust bar $D^9$ downward and its lower end outward by reason of the coaction between the bevel thereon and the beveled part $D^{10}$ of the frame work. The slotted part of the thrust bar working against the journal head $D^8$ forces the shaft to the right, overcoming the spring $D^5$, and of course the shaft remains to the right as long as the total key is depressed.

In Fig. 16 a construction is shown which provides for shifting the shaft $D^1$ to the right or not as desired when the total key is depressed. Here the upper end of the thrust bar E is formed with an angular slot comprising a short portion $E'$ extending transversely of the bar and a longer portion $E^2$ running longitudinally of the bar. A stud $E^3$ on the arm $227^R$ occupies the slot and with the forward end of the thrust bar elevated as shown in Fig. 16 it will be obvious that the rearward swing of the arm $227^R$ resulting from depression of the total key will have no effect upon the thrust bar. A spring $E^4$ connects the thrust bar with said arm, thus normally holding said bar in such relation to the arm as not to be affected thereby. The bar extends forward of the slotted portion as shown at $E^5$, the extension having cam formation on its upper edge which is engaged by a roller stud $E^6$ carried by one arm $E^7$ of a bell crank lever. The latter is pivoted on a cross rod of the machine below the keyboard and its other arm $E^8$ carries a roller stud $E^9$ bearing against a slide bar or strip F suitably mounted under the lower keyboard plate 212. A pin $F^1$ secured to the forward part of this strip or bar projects up through slots in the keyboard plates and through a slot in an index plate $F^2$, Fig. 17, secured on the upper keyboard plate. Said pin is surmounted by a knob $F^3$, which has a pointer $F^4$ to register with suitable inscriptions on said plate. The strip or bar F is formed with a cam rise $f$ normally standing just forward of the roller stud $E^9$ and normally the knob $F^3$ is at the forward end of the slot in the index plate $F^2$, the pointer $F^4$ registering with the proper inscription, such for example as the word "Print." By pushing the knob back and bringing said pointer to register with the other inscription, e. g. the words "Not print" the cam rise $f$ of the strip or bar F will be caused to force downwardly the arm $E^8$ of the bell crank whose other arm $E^7$ will displace the thrust bar E carrying the transverse branch $E'$ of the slot into engagement with the stud $E^3$. Then when the total key is depressed the thrust bar E will be forced down with the effect hereinbefore described.

The examples shown in Figs. 18 to 23 illustrate various kinds of work, of which a machine equipped with the present invention is capable. Fig. 18 represents work of the machine at normal, when any amount up to the decimal capacity of the machine can be set up on the keyboard, registered in the accumulator and printed and a total struck extending throughout the decimal arrangement of the parts. Fig. 19 illustrates work when a single split is established for the running of two separate lists and the striking of a total of each. In this case the handle $B^{11}$ is moved to the first position, establishing the split between the seventh and eighth decimal places as before described and the movement is insufficient to bring any of the projections on the hammer blocking device $D^1$ into effective position. Therefore as none of the hammers will be obstructed upon depression of the total key and operation of the machine a total will be struck for each list. Fig. 20 illustrates work in which three separate columns are printed and no total of the left hand column, though totals of the other two are printed. This work is done with the handle $B^{11}$ at the second position when the splits are established between the third and fourth and ninth and tenth latches. When so adjusted the handle has turned the shaft $D^1$ so as to bring the projections $D^2$ thereof to such positions that when said shaft is moved sidewise by depression of the total key these projections will come directly over the extensions $d$ of the three left hand hammer drivers and consequently the connected hammers cannot operate and no total will be printed under the left hand column. Fig. 21 illustrates an example of work in which a split is established between the fifth and sixth decimal places, which is brought about by moving the handle $B^{11}$ to the third position. This results in further turning of the shaft $D^1$, bringing the five projections $D^3$ thereof to such positions that when the total key is depressed these projections will move directly over the extension $d$ of the five left hand hammer drivers. Consequently in a totaling operation no total will be struck under the left hand column. When the handle B¹¹ is moved to the fourth position for establishing splits between the third and fourth and sixth and seventh decimal places (Fig. 22) the further turning of the shaft D' brings the six projections D⁴ thereof to such positions that when the shaft is moved sidewise in depression of the total key these projections will move directly over the extensions $d$ of six left hand hammer drivers and consequently no totals will be printed under the two left hand columns. Movement of the handle B¹¹ to the fifth position establishing splits between the third and fourth and seventh and eighth decimal places (Fig. 23) causes the shaft D' to bring its seven projections D⁵ to such positions that when the shaft is shifted through depression of the total key these projections will move directly over the extensions $d$ of seven left hand hammer drivers, with the result that no totals will be printed under the two left hand columns. Of course it will be understood that with a construction such as that shown in Fig. 16, unless the knob F³ is pushed back to the "Not print" position shown in Fig. 17, there will be no blocking of hammers and totals would be printed under all of the columns.

To prevent accidental movement of the knob, the connected strip F is formed with a V-shaped portion $f^3$ engaged by a roller stud $f^4$ on the upper end of a bar F⁵, which is slidingly mounted on the frame-work of the machine and upheld by a spring $f^5$. This construction also insures full movement of the strip by reason of the camming action between the parts.

What is claimed is:

1. In a machine of the character described, the combination of a series of impression means coöperatively related for the printing of ciphers to right of digits; means for discontinuing the coöperative action at different points; means for eliminating impressions to one side of any such point; and controlling devices common to said discontinuing and eliminating means whereby the same manipulation will set both means.

2. In a machine of the character described, the combination of a series of impression means coöperatively related for the printing of ciphers to right of digits; means for discontinuing the coöperative action at different points; means for eliminating impressions to one side of any such point; and controlling devices common to said discontinuing and eliminating means whereby the same manipulation will set both means; together with manipulative means for determining whether or not the set eliminating means shall take effect.

3. In a machine of the character described, the combination of a series of impression means coöperatively related for the printing of ciphers to right of digits; means for discontinuing the coöperative action at different points; means for eliminating impressions to one side of any such point; controlling devices common to said discontinuing and eliminating means whereby the same manipulation will set both means; type; means for setting up the same; an accumulator; totaling connections between the latter and the type; and means controlled by said totaling connections for rendering effective the eliminating means.

4. In a machine of the character described, the combination of a series of impression means coöperatively related for the printing of ciphers to right of digits; means for discontinuing the coöperative action at different points; means for eliminating impressions to one side of any such point; controlling devices common to said discontinuing and eliminating means whereby the same manipulation will set both means; manipulative means for determining whether or not the set eliminating means shall take effect; type; means for setting up the same; an accumulator; totaling connections between the latter and the type; and means controlled by the total connections for causing the eliminating means to act.

5. In a machine of the character described, the combination of a series of impression means coöperatively related for the printing of ciphers to right of digits; means for discontinuing the coöperative action at different points; means for eliminating impressions to one side of any such point; controlling devices common to said discontinuing and eliminating means whereby the same manipulation will set both means; manipulative means for determining whether or not the set eliminating means shall take effect; type; means for setting up the same; an accumulator; totaling connections between the latter and the type; and means operated by said totaling connections for rendering the eliminating means effective.

6. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, and means for correspondingly obstructing the hammers.

7. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, and means for correspondingly obstructing the hammers; together with manipulative means for determining whether or not said obstructing means shall be effective.

8. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, means for correspondingly obstructing the hammers; type; means for setting up the same; an accumulator; totaling connections between the latter and the type; and means controlled by said totaling connections for rendering effective the hammer-obstructing means.

9. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, means for correspondingly obstructing the hammers, manipulative means for determining whether or not said obstructing means shall be effective; type; means for setting up the same; an accumulator; totaling connections between the latter and the type; and means controlled by said totaling connections for rendering effective the hammer-obstructing means.

10. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, means for correspondingly obstructing the hammers, manipulative means for determining whether or not said obstructing means shall be effective; type; means for setting up the same; an accumulator; totaling connections between the latter and the type; and means operated by said totaling connections for rendering effective the hammer-obstructing means.

11. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, and means for correspondingly obstructing the hammers, the same including a shiftable member equipped to present abutments for varying numbers of hammers.

12. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, and means for correspondingly obstructing the hammers; the same comprising a rotatable member with stepped abutments for varying numbers of hammers.

13. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a shiftable member equipped to varyingly present abutments for obstructing hammers to one side of a selected point of disablement in the latch-displacing means; and manipulative means for determining whether or not said member shall be effective.

14. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a shiftable member equipped to varyingly present abutments for obstructing hammers to one side of a selected point of disablement in the latch-displacing means; said member being movable into and out of position for presenting such abutments; type; setting up devices; an accumulator; totaling connections between the latter and the type; and means controlled by the totaling connections for moving the said member into and out of effective position.

15. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a shiftable member equipped to varyingly present abutments for obstructing hammers to one side of a selected point of disablement in the latch-displacing means; said member being movable into and out of position for presenting such abutments; type; setting up devices; an accumulator; totaling connections between the latter and the type; means controlled by the totaling connections for moving the said member into and out of effective position; and manipulative means controlling said last mentioned means.

16. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; and manipulative means for determining whether or not said member shall be effective.

17. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being movable into and out of position for presenting such abutments; type; setting up devices; an accumulator; totaling connections between the latter and the type; and means controlled by the totaling connections for moving the said member into and out of effective position.

18. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch displacing means; said member being movable into and out of position for presenting such abutments; type; setting up devices; an accumulator; totaling connections between the latter and the type; means controlled by the totaling connections for moving the said member into and out of effective position, and manipulative means controlling said last mentioned means.

19. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type; and means controlled by the totaling connections for moving the said member into and out of effective position.

20. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type; means controlled by the totaling connections for moving the said member into and out of effective position, and manipulative means controlling said last mentioned means.

21. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; and means operated by said key for shifting the said rotatable member axially into effective position.

22. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; means operated by said key for shifting the said rotatable member axially into effective position, and independent manipulative means controlling said last-mentioned means.

23. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; a spring holding the rotatable member axially displaced from effective position; and a thrust-bar adapted to cam said member into effective position and operated by said key.

24. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; a spring holding the rotatable member axially displaced from effective position; a thrust-bar adapted to cam said member into effective position and operated by said key, and manipulative means for coupling said bar to and uncoupling it from the said key.

25. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; a spring holding the rotatable member axially displaced from effective position; a thrust-bar adapted to cam said member into effective position and having an angular slot; a rock-arm connected with said key and having a stud in said slot; and manipulative means for engaging an effective portion of the said slot with said stud.

26. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, a rotatable member with stepped abutments for obstructing varying numbers of hammers to one side of a selected point of disablement in the latch-displacing means; said member being axially movable into and out of position for presenting its abutments; type; setting up devices; an accumulator; totaling connections between the latter and the type, including a depressible key; a spring holding the rotatable member axially displaced from effective position; a thrust-bar adapted to cam said member into effective position and having an angular slot; a rock-arm connected with said key and having a stud in said slot; a spring maintaining a longitudinal branch of the slot in line with said stud; a lever for moving the thrust bar to engage a transverse portion of its slot with the stud; and a cam-slide acting on the lever and equipped by manipulation.

27. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches; and means for correspondingly obstructing the hammers; the same comprising a rotatable member with stepped abutments for varying numbers of hammers and carrying a gear wheel; a gear segment engaging the latter; and an index handle operatively connected with said segment.

28. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches; and means for correspondingly obstructing the hammers; the same comprising a rotatable member with stepped abutments for varying numbers of hammers and carrying a gear wheel; a gear segment engaging the latter; a rock shaft having a crank arm; a link connecting the latter with said segment; an operating arm on the rock shaft, and an index over which said arm works.

29. In a machine of the character described, the combination of sets of type, setting up devices for the same, hammers for the respective sets of type, latches holding the hammers normally retracted, means for individually displacing the latches, means for causing automatic successive displacement of latches, means for selectively disabling the latter means between one or another pair of latches, and means for correspondingly obstructing the hammers; the same comprising a rotatable and axially movable member with stepped abutments for varying numbers of hammers and carrying a gear wheel; a gear segment engaging the latter; an index handle operatively connected with said segment; and manipulative means for controlling the axial position of the member.

30. In a machine of the character described, the combination with impression hammers; of manipulative means for blocking varying numbers of such hammers, the same including a shiftable member with varied abutments for obstructing hammers.

31. In a machine of the character described, the combination with impression hammers; of manipulative means for blocking varying numbers of such hammers, the same comprising a rotatable member with stepped abutments to obstruct hammers.

32. In a machine of the character described, the combination with impression hammers; of manipulative means for blocking varying numbers of such hammers, the same comprising a rotatable and axially shiftable member with stepped abutments to obstruct hammers.

33. In a machine of the character described, the combination with impression hammers; of manipulative means for blocking varying numbers of such hammers, the same comprising a rotatable member with stepped abutments to obstruct hammers and a gear wheel; a gear segment engaging the latter; and an index handle operatively connected with said segment.

34. In a machine of the character described, the combination with impression hammers; of manipulative means for blocking varying numbers of such hammers, the same comprising a rotatable member with stepped abutments to obstruct hammers and a gear wheel; a gear segment engaging the latter; a rock shaft having a crank arm; a link connecting the latter with said segment; an operating arm on the rock shaft, and an index over which said arm works.

35. In a machine of the character described, impression devices comprising spring-impelled hammers, pivoted latches restraining the same respectively and mounted side by side, and pitmen pivoted to adjacent latches and one being shouldered and the other carrying a pivoted catch spring-held in line with the shoulder whereby displacement of one latch to release its hammer will cause displacement of the next adjacent latch.

36. In a machine of the character described, impression devices comprising spring-impelled hammers, pivoted latches restraining the same respectively and mounted side by side, pairs of pitmen pivoted to adjacent latches and one pitman of each pair shouldered and the other carrying a pivoted catch spring-held in line with the shoulder, and a shaft having longitudinally spaced projections for acting on the catches whereby one or another of the same may be displaced; substantially as and for the purpose described.

37. In a machine of the character described, impression devices comprising spring-impelled hammers, pivoted latches restraining the same respectively and mounted side by side, pairs of pitmen pivoted to adjacent latches and one pitman of each pair shouldered and the other carrying a pivoted catch spring-held in line with the shoulder, and a shaft having spirally spaced projections for acting on the catches whereby one or another of the same may be displaced; substantially as and for the purpose described.

38. In a machine of the character described, impression devices comprising spring-impelled hammers, pivoted latches restraining the same respectively and mounted side by side, pairs of pitmen pivoted to adjacent latches and one pitman of each pair shouldered and the other carrying a pivoted catch spring-held in line with the shoulder, and a shaft having spaced projections for acting on the catches, certain of the projections being in longitudinal alinement and others out of such alinement whereby catches may be displaced singly or in pairs.

39. In a machine of the character described, impression devices comprising spring-impelled hammers, pivoted latches restraining the same respectively and mounted side by side, pairs of pitmen pivoted to adjacent latches and one pitman of each pair shouldered and the other carrying a pivoted catch spring-held in line with the shoulder, a shaft having spaced projections for acting on the catches, said shaft carrying a gear wheel, a gear segment in mesh with said wheel, and an index handle operatively connected with said segment.

40. In a machine of the character described, the combination with printing hammers and restraining detents therefor; of thrust-pieces attached to adjacent detents and a movable catch effecting a separable connection between the thrust-pieces.

41. In a machine of the character described, the combination with printing hammers and restraining detents therefor; of thrust-pieces attached to adjacent detents, a guide rod on which said thrust-pieces slide, and a movable catch effecting a separable connection between the thrust-pieces.

42. Printing mechanism for accounting machines comprising impression-making members coöperatively related for cipher-printing, separable coupler-pieces permanently attached to adjacent impression-making members, and a relatively stationary member guiding the coupler pieces.

JESSE G. VINCENT.

Witnesses:
 ARTHUR W. FRENZEL,
 R. S. MIELERT.